United States Patent [19]

Sasaki

[11] 4,438,672
[45] * Mar. 27, 1984

[54] PIPE SHEARING DEVICE

[76] Inventor: Yoshikazu Sasaki, 9-1, Sakuradai 4-chome, Nerima-ku, Tokyo, Japan

[*] Notice: The portion of the term of this patent subsequent to Nov. 30, 1999 has been disclaimed.

[21] Appl. No.: 330,494

[22] Filed: Dec. 14, 1981

[51] Int. Cl.³ .......................... B26D 1/28; B26D 1/56
[52] U.S. Cl. .......................................... 83/319; 83/54; 83/519
[58] Field of Search .................................. 83/318–320, 83/330, 54, 519

[56] References Cited

U.S. PATENT DOCUMENTS

| | | | |
|---|---|---|---|
| 1,148,250 | 7/1915 | Muhlbauer | 83/318 |
| 1,226,066 | 5/1917 | DuBrul | 83/318 |
| 1,242,478 | 10/1917 | Rosewarne | 83/318 X |
| 2,741,309 | 4/1956 | Czarnik . | |
| 3,129,624 | 4/1964 | Auer . | |
| 3,380,331 | 4/1968 | Boothe, Jr. et al. . | |
| 4,108,029 | 8/1978 | Borzym . | |
| 4,361,064 | 11/1982 | Sasaki | 83/319 |

Primary Examiner—James M. Meister
Attorney, Agent, or Firm—Wenderoth, Lind & Ponack

[57] ABSTRACT

A pipe shearing device comprising a carriage supported slidably by a pair of spline shafts, a drum cam disposed in parallel with the carriage and engaging a pair of follower rollers of the carriage in its cam rail under a holding condition, a rotary drive means connected through a gear train to said spline shafts, a pair of rotary blades provided respectively on a pair of spline bosses which are supported by said carriage and in engagement with said spline shafts, a pair of arms provided on said carriage and adapted to open or close freely, chucks provided to counter to the pair of arms and a pipe chuck mechanism composed of lower blades provided in the chucks respectively and having an arm drive mechanism imparted, so that while the carriage is making a reciprocal movement produced by the revolution of the drum cam, the chuck mechanism grips or holds the pipe during such section of the forward movement of the carriage that the carriage speed is in synchronism with the pipe feed speed, while one of the rotary blades having a rotary drive force given by the spline shafts revolving in a reverse direction to each other incises part of the pipe surface, and the other rotary blade successively cuts the pipe at the incision part into a predetermined length.

4 Claims, 12 Drawing Figures

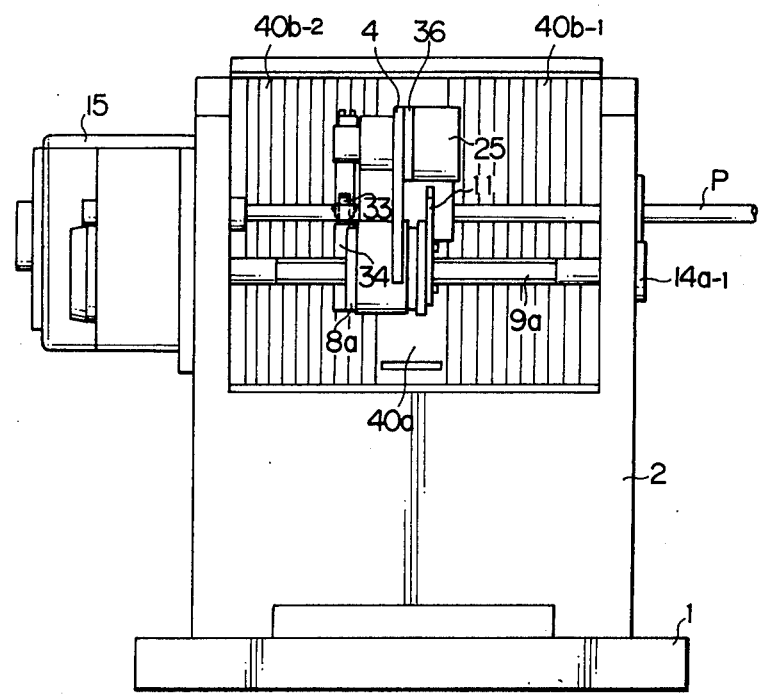
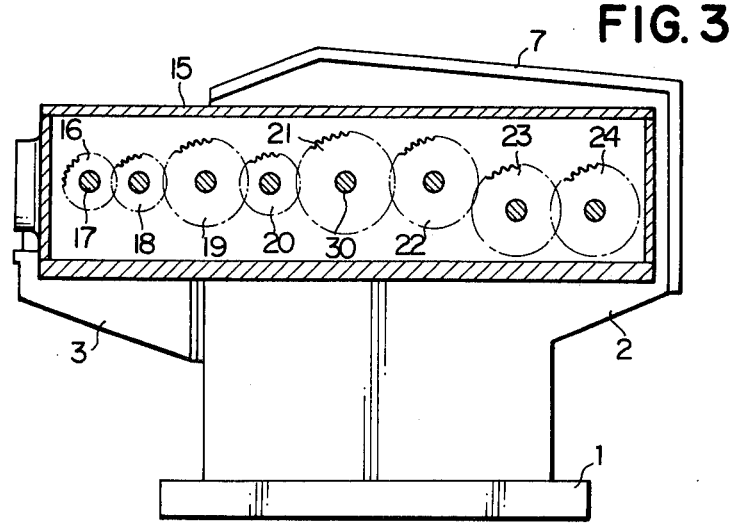

PIPE SHEARING DEVICE

BACKGROUND AND SUMMARY OF THE INVENTION

This invention relates to a pipe shearing device or, more particularly, to a device which is adapted to shear a pipe fed to the device at a constant speed precisely into predetermined lengths.

There are several types of pipe shearing devices of conventional design. One of them is comprised of a lower blade fixed on a carriage and an upper blade adapted to be moved up and down freely by a crank mechanism, while the carriage is designed to be moved reciprocally along the pipe and a pipe carrier by a rack-and-pinion mechanism.

As the carriage and the pipe fed by the pipe carrier move in the same direction at the same speed (while their speeds are synchronized with each other), the upper blade comes down and cooperates with the lower blade successively to cut the pipe fed by the pipe carrier into pieces of a predetermined length successively.

A device of this type requires two sources of power: one is to be provided for operating the upper blade and the other for driving the rack-and-pinion mechanism. Thus, operation of such a device involves much power consumption in proportion to the number and capacity of the power sources required. Moreover, the pipes cut by such a device have end faces distorted by the shearing force of the upper blade and, when viewed facing to the end face of each a dimple is seen formed at the upper part of the end face.

Another conventional device is provided with a carriage having a vertical square slit in which a slidable member having the upper blade fixed is set so that it will move up and down freely and at the lower end of which the lower blade is arranged firmly. The vertical movement of the upper blade and reciprocal movement of the carriage are actuated by a motor which drives a crank mechanism and which is controlled by a motor controller. However, in order for such device to be operated exactly and in a smooth manner, an additional controller is required besides the main controller.

The end faces of pipes cut by this type of device are also distorted and, when viewed facing their end faces, dimples are seen formed at about their upper parts.

One pipe shearing device free of the main shortcomings of the conventional devices is disclosed in patent applications filed in Japan (Patent Application No. SHO 54-131219), U.S. Ser. (No. 192,835), Canada (No. 361,429) and West Germany (P3038043.9). The Japanese application published on May 18, 1981 with Patent Publication No. SHO 56-56321.

This prior device comprises a holder means, and a pair of rotary blades and a clamp means mounted on the holder means, the rotary blades consisting of a first blade and a second blade, the clamp means gripping and holding a pipe while the blades shear the pipe. The holder means has fixed at its lower part a cam follower which is engaged with the cam groove of a drum cam installed thereunder so that it makes a reciprocal movement as the drum cam revolves. The pair of rotary blades are driven by torque conveyed across a pair of spline shafts in opposite directions while being movable freely in the shaft direction to permit cutting of a pipe free from the formation of a dimple by giving an incision at a predetermined position of the pipe with the first blade and cutting the pipe at such position with the second blade. Further, the clamp means is composed of two pairs of wall blocks. Each pair consists of a movable block and a fixed block each having a respective semicircular lower blade provided on a side end face, these lower blades forming a true circle when both blocks join. As the movable block moves, it comes into contact with, and separates from, the fixed block on the side end face. The pipe, when the pair of rotary blades shear it, is gripped or held by the lower blades as the movable blocks come into contact with the fixed blocks on their respective side end faces. The pair of rotary blades perform shearing as they pass a clearance provided between two pairs of wall blocks. Pipe shearing is, of course, performed when the holder means is driven forwardly by the drum cam at the same speed with the pipe.

This device has the advantage that when used to sheer a pipe no dimple is produced on the pipe end face. However, this device does create a problem in that the reciprocal movement of the holder means is effected by a combination of the drum cam having a cam groove and the cam follower engaged with the cam groove of the drum cam so that when the holder means changes its direction of travel, the surface of engagement of the cam follower changes in the cam groove, resulting in chattering and great vibration. The device has other problems as well. The drum cam is not constructed to be light in weight and the drum cam has to be located beneath the holder means and is, therefore, subject to impingement by chips from the pipe. Further, the clamp means including its drive mechanism is rather complicated in structure so that it takes much time to maintain or change the diameter of the lower blades, when such is required.

The present invention provides a solution to the problems found in the conventional pipe shearing devices, and has a structure comprising the following components:

(1) a carriage supported for free movement by a pair of spline shafts and coupled to a pair of follower rollers connected in a holding condition to a cam rail on a drum cam which is disposed in parallel with the carriage and is separated from the carrier by a partitioning curtain, the drum cam being driven to rotate by a motor across a gear train so that the carriage makes a reciprocal movement as the drum cam revolves;

(2) a pair of rotary blades mounted rotatably on the carriage and provided in a pair of spline bosses respectively enmeshed with the pair of spline shafts, the spline shafts being supported by a box and adapted to revolve in opposite directions, so that one of the rotary blades cuts the surface of the pipe being fed by a pipe carrier to form a slit in the pipe as the blade revolves, while the other rotary blade cutting the pipe successively at the slit into predetermined lengths as it revolves in a reverse direction, this operation being performed in one revolution of the respective blades; and (3) a chuck mechanism disposed on the carrier and comprising a pair of arms adapted to open or close freely, chucks provided to counter the arms and a lower blade provided in each of the chucks so that when the arms are operated to close by an arm drive mechanism, the grip or hold of the pipe by the lower blades is continued until the rotary blades perform pipe incision and cut through clearances formed in the arms.

It is an object of the present invention to provide means for cutting a pipe with ease and without deformation of the end face by providing a pair of rotary blades revolving in opposite directions and having one of the rotary blades form a slit at a predetermined position of the pipe and the other cut the pipe through the slit.

Another object of the invention is to provide a compact pipe shearing device which cuts a running pipe exactly into predetermined lengths at a high speed and with a small power source.

A further object of the invention is to provide a pipe shearing device which is controllable with ease by a numerical control system of the prior art.

A still further object of the invention is to provide a pipe shearing device having less vibration in operation and involving less failure than pipe shearing devices of the prior art, and permitting the device to be easily maintained.

The above and novel features of the invention will be more fully understood from the following description when the same is read in connection with the accompanying drawings. It should be noted, however, that the drawings are for the purpose of illustration only and are not intended to define the limits of the invention in any way.

BRIEF DESCRIPTION OF THE DRAWINGS

FIG. 1 is an elevational view of a preferred embodiment of the invention.

FIG. 3 is a cross-sectional view the device taken along line III—III in FIG. 2.

DETAILED DESCRIPTION OF THE INVENTION

The present invention will now be described in detail with reference to a preferred embodiment shown in the accompanying drawings.

Figure 2:
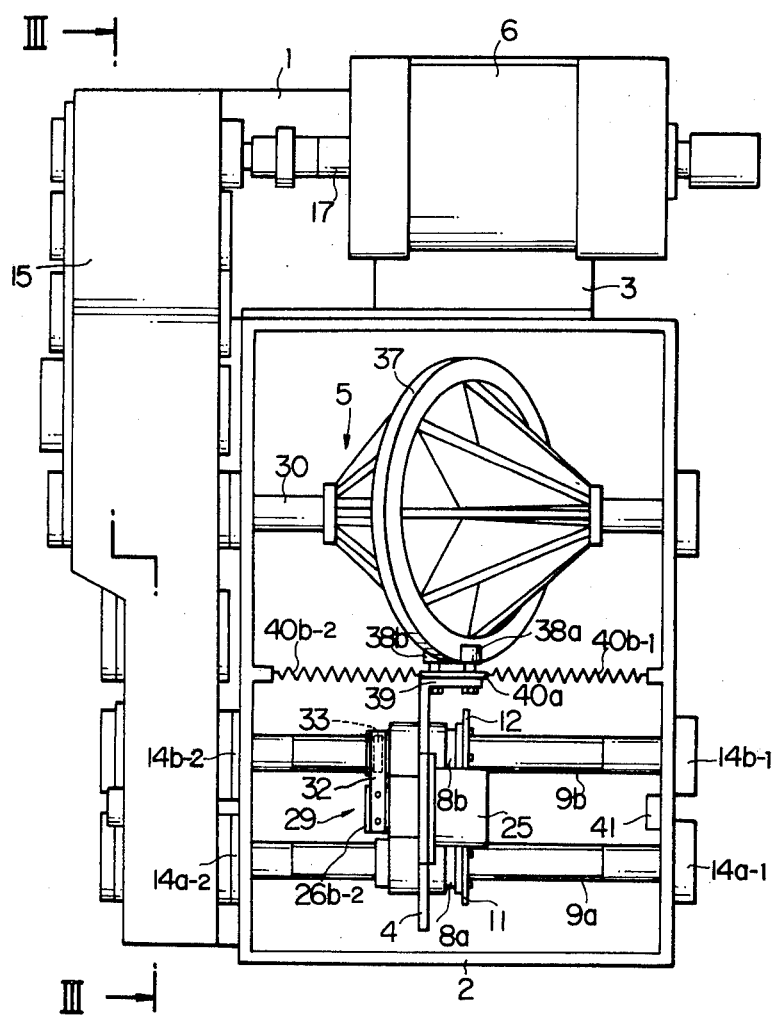
FIG. 2 is a plan view of the device shown in FIG. 1.

Referring to FIGS. 1, 2 and 3, a base stand 1 has a frame 2 disposed thereon, and to the frame 2, a motor stand 3 is fixed firmly. In the frame 2 are arranged a carriage 4 and a drum cam 5, and a motor 6 is mounted to the motor stand 3. The frame 2 has its top covered by a translucent cover 7 which is adapted to open or close freely. Carriage 4 is supported slidably by ball spline shafts 9a and 9b inserted in ball spline bosses 8a and 8b provided therein. Ball spline shafts 9a and 9b are supported at opposite ends by frame 2.

Figure 4:
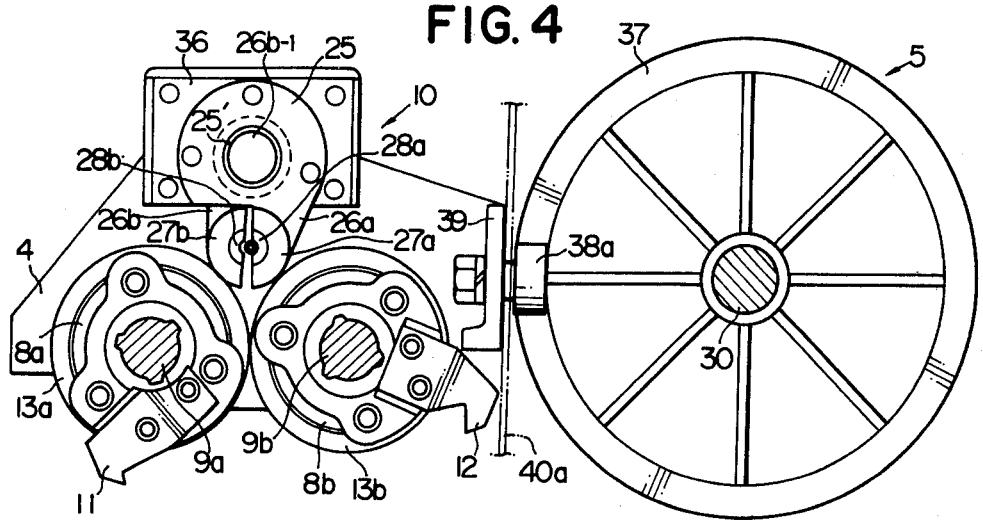
FIG. 4 is an enlarged, partially cross-sectional front view of the carriage and drum cam of the invention.

As shown in FIG. 4, a chuck mechanism 10, and a pair of rotary blades comprising first and second blades 11 and 12 are provided on the carriage 4.

Figure 8:
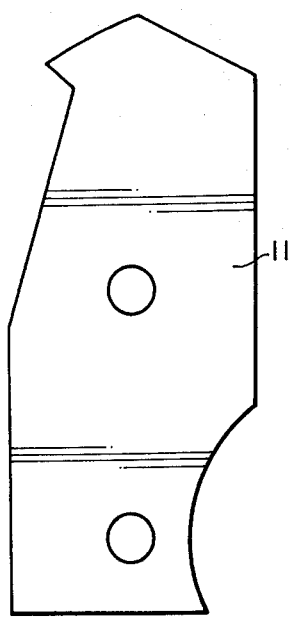
FIG. 8 is an enlarged side view of the first blade.
Figure 9:
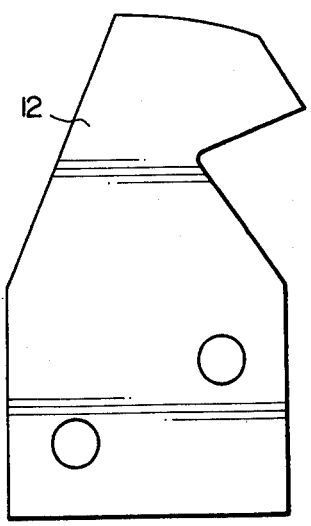
FIG. 9 is an enlarged side view of the second blade.

The first blade 11 has a small, sharp edge at one extreme end and bolt holes provided at its middle and lower parts, as shown in FIG. 8. The second blade 12 also has a sharp edge longer than that of the first blade 11 provided on one side of one extreme end and screw holes at its middle and lower parts, as shown in FIG. 9. Blades 11 and 12 are mounted firmly to the ball spline bosses 8a and 8b respectively, as shown in FIG. 4.

The ball spline bosses 8a and 8b are slidably enmeshed with the ball spline shafts 9a and 9b and are maintained rotatably in the peripheral direction and respectively fixedly in the axial direction by means of bearings 13a and 13b disposed at the lower part of the carriage 4.

Ball spline shafts 9a and 9b are, as shown in FIG. 2, respectively rotatably supported at opposite ends by bearings 14a-1 and 14a-2, and 14b-1 and 14b-2 disposed on the frame of frame 2 and are connected to motor 6 through a gear train disposed in a gear box 15. Both ball spline shafts 9a and 9b are adapted to guide and support carriage 4 and, at the same time, function to give a rotary drive force to rotary blades 11 and 12.

The gear train stated above is as shown in FIG. 3.

Referring to FIG. 3, the gear train includes gear 16 firmly mounted on motor shaft 17. Gear 16 engages an idle gear 18 which in turn connected through idle gears 19 and 20 to a gear 21 mounted firmly on the cam shaft 30 of the drum cam 5. The gear 21 is enmeshed with an idle gear 22, and this idle gear 22 is enmeshed with a gear 23, and the gear 23 with a gear 24. The gears 23 and 24 are mounted firmly on ball spline shafts 9b and 9a respectively.

First blade 11 and second blade 12 are mounted firmly on ball spline bosses 8a and 8b engaged with ball spline shafts 9a and 9b, respectively. Therefore, when gears 24 and 23 revolve in opposite directions, ball spline shafts 9a and 9b revolve in opposite directions and, the first and second blades 11 and 12 revolve in opposite directions.

Figure 10:
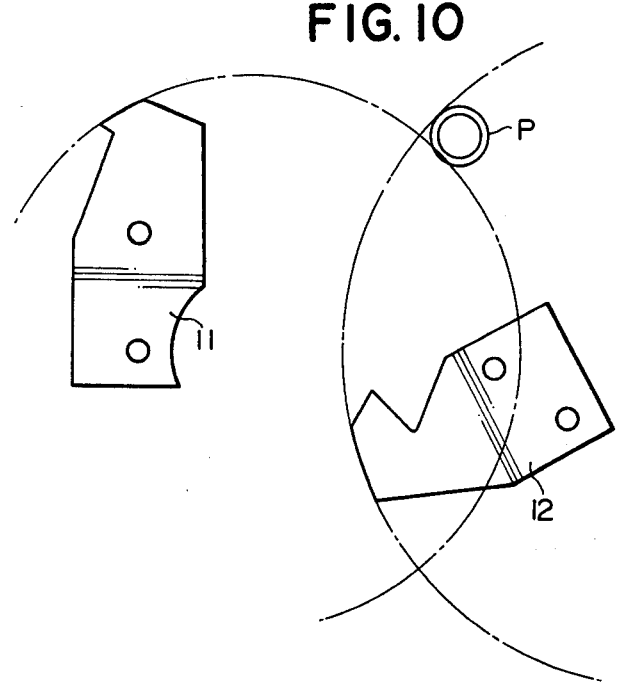
FIG. 10 is a diagram showing schematically the operation of a pair of rotary blades embodying the present invention.

Ball spline shafts 9a and 9b are disposed in parallel and are so arranged respectively impart across the ball spline bosses 8a and 8b to first blade 11 and second blade 12 oppositely directed rotary motion, as stated above. Referring to FIG. 4, if for example the ball spline shaft 9a, which drives the first blade 11 to rotate, revolves in a counterclockwise direction, the other spline shaft 9b, which drives the second blade 12 to rotate, is so designed as to revolve in a clockwise direction. Thus, as shown in FIG. 10, when the first blade 11 cuts off a lower part of the pipe P in its counterclockwise revolution, the second blade 12 immediately cuts the pipe P into a predetermined length at the cutoff position in its clockwise revolution.

Figure 7:
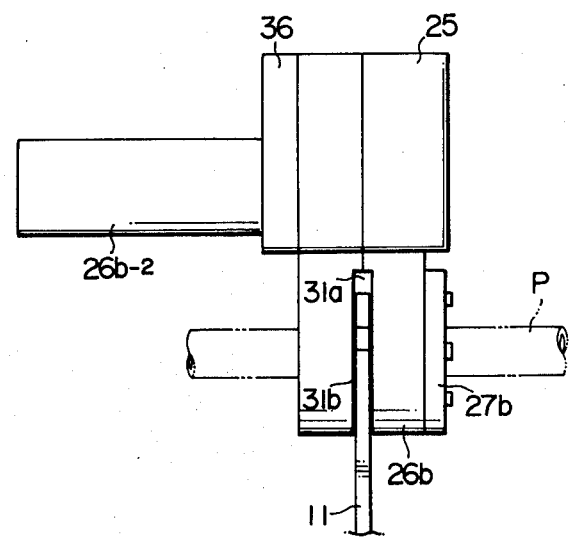
FIG. 7 is a side view of the chuck mechanism shown in FIG. 6.

As shown in FIGS. 4, 5, 6 and 7, there is provided a chuck mechanism 10 which is comprised of a fixed arm 26a formed integrally with a base 25, a movable arm 26b which counters fixed arm 26a, chucks 27a and 27b provided in arms 26a and 26b respectively, semicircular lower blades 28a and 28b provided on the chucks 27a and 27b so that they will face each other with the chucks 27a and 27b also facing each other, and a drive mechanism 29 which drives the movable arm 26b so that the chucks 27a and 27b may be opened or closed. In the pair of arms 26a and 26b are provided clearances 31a and 31b, as shown in FIG. 7, to permit passage of rotary blades 11 and 12 as they revolve.

Figure 5:
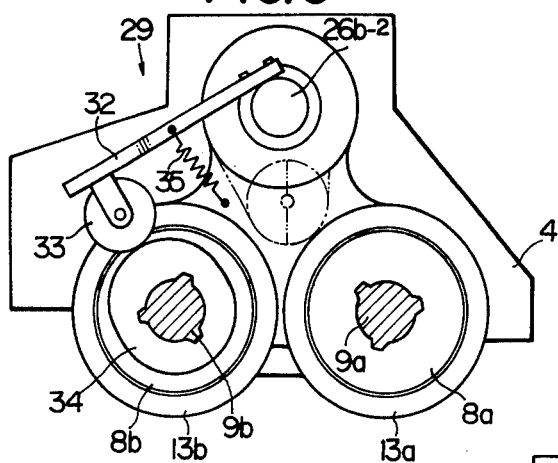
FIG. 5 is an enlarged schematic rear view of the carriage shown in FIG. 4 showing the drive mechanism of the chuck mechanism.
Figure 6:
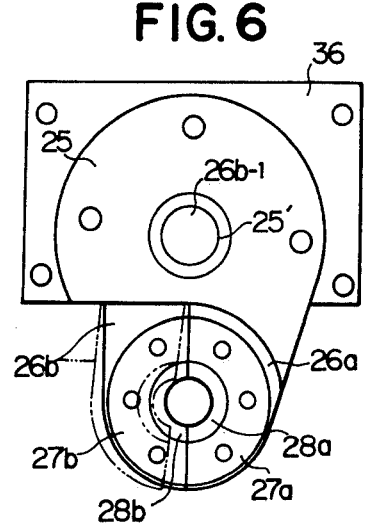
FIG. 6 is an enlarged front view of the chuck mechanism.

Chuck mechanism 10 is fitted to the carriage 4 by bolt fastening a holding plate 36 to the carriage 4, as shown in FIGS. 1, 2 and 4. Further, drive mechanism 29 is comprised, as shown in FIGS. 1, 2 and 5, of a roller support rod 32 one end of which is set firmly at the drive shaft 26b-2 projecting rearward of the carriage 4, a follower roller 33 supported at the other end of the roller support rod 32, a cam 34 on the ball spline boss 8b, and a spring 35 provided between the roller support rod 32 and the carriage 4 so that the follower roller 33 is kept in contact firmly with the cam 34.

Thus, as the cam 34 revolves with revolution of the ball spline shaft 9b and ball spline boss 8b, the movable arm 26b is caused to revolve to the left or right through the roller support rod 32 and the drive shaft 26b-2 to open or close the chucks 27a and 27b. Here, the cam 34 is so adjusted that when incision and cutting by rotary blades 11 and 12 are made, the grip and hold of the pipe P by the chucks 27a and 27b are made in synchronism.

That is, while the pipe P is gripped by the lower blades 28a and 28b of the chucks 27a and 27b, the pair of rotary blades 11 and 12 pass through clearances 31a and 31b alternately from opposite sides and incise and cut the pipe P.

Figure 11:
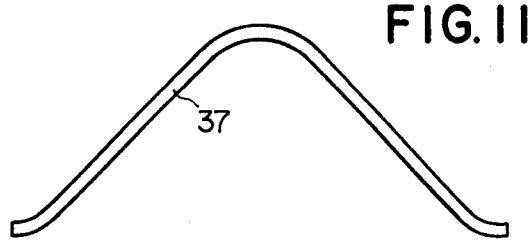
FIG. 11 is a diagram showing only the cam rail on the drum cam in a developed state.

The cam shaft 30 of drum cam 5 is disposed in the frame 2 in parallel with ball spline shafts 9a and 9b, as shown in FIG. 2 and is thus adapted to drive the drum cam 5 to revolve in a predetermined direction. This drum cam 5 has a cam rail 37, such as shown in FIG. 11, to which a pair of roller followers 38a and 38b disposed on the side of the carriage 4 are coupled in a holding position on opposite sides of rail 37. The roller followers 38a and 38b are mounted on a supporting plate 39 on the side of the carriage 4. Supporting plate 39 has a curtain drive plate 40a connected thereto. To either side of the curtain drive plate 40a are respectively connected bellows type partition curtains 40b-1 and 40b-2. Partition curtains 40b-1 and 40b-2 are connected at their outer ends to frame 2. Curtains 40b-1 and 40b-2 separate the space in which the carriage 4 is stored from that in which the drum cam 5 is stored and yet allow reciprocal movements of the roller followers 38a and 38b.

As stated above, the cam shaft 30 of the drum cam 5 is connected to the motor 6 across the gear train disposed in the gear box 15.

Thus, the drive force of the motor 6 is transmitted through the gear train, cam shaft 30, cam rail 37 of the drum cam 5 and pair of roller followers 38a and 38b to the carriage 4, whereby the carriage 4 is caused to make a reciprocal movement.

Cutting operation is made by the pair of rotary blades 11 and 12 midway of the forward stroke of the carriage 4 as described below.

Numeral 41 indicates a pipe guide which guides the pipe P fed by the pipe carrier so that the pipe is inserted between the lower blades 28a and 28b of the chuck mechanism 10.

The operation of the device will now be described.

The device is normally controlled by a numerical control system, and the successive pipe cutting operation is accomplished as described below.

The drive force of the motor 6 is conveyed through the motor shaft 17, gear train in the gear box 15, cam shaft 30, cam rail 37 of the drum cam 5 and pair of roller followers 38a and 38b to the carriage 4 so that the carriage 4 is shifted to the left or right as viewed in FIG. 1 as it is slidably supported by the ball spline shafts 9a and 9b.

Revolution of the motor 6 is also conveyed through the gear train in the gear box 15 to the ball spline shafts 9a and 9b, whereby the first blade 11 provided on the ball spline boss 8a which is engaged with the spline shaft 9a and the second blade 12 provided in the ball spline boss 8b which is engaged with the spline shaft 9b, revolve in opposite directions.

The first blade 11 revolves in a counterclockwise direction through the clearances 31b and 31a formed respectively in the fixed arm 26a and movable arm 26b of the chuck mechanism 10 and, at this time, cuts the pipe P to form a slit on the surface at the lower part. Successively, the second blade 12 revolves through the clearances 31a and 31b in a clockwise direction and cuts the pipe P into a desired length at the position of the slit. This pipe cutting is accomplished while the pair of rotary blades 11 and 12 revolve 360°.

While the cutting process is being carried out as stated above, the pipe P is held firmly by the lower blades 28a and 28b fitted to the pair of arms 26a and 26b by means of the chucks 27a and 27b respectively, as has been described above.

The incising and cutting operation of the pair of rotary blades 11 and 12 is made midway of the forward stroke of the carriage 4. The stop point of the carriage 4, that is, the point at which carriage 4 starts moving, is the midpoint of the backward stroke.

Figure 12:
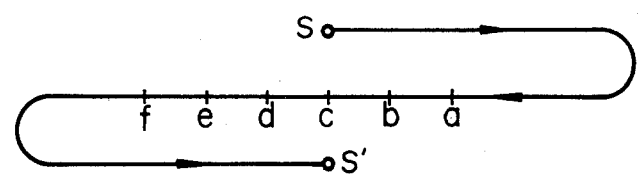
FIG. 12 is a diagram illustrating the operation of the carriage as related to the pipe carrier, chuck mechanism and rotary blades sequentially after the pipe cutting process.

The stop point is shown by letter S in FIG. 12, which illustrates the principle of carriage shift, clamping, cutting and releasing.

Referring to FIG. 12, the carriage 4 starts from the point S which is the midpoint of the backward stroke and changes its direction of travel as illustrated into the forward stroke. In the course of the forward stroke, the carriage 4 travels at a speed synchronized with the speed of the pipe carrier which feeds the pipe P. The position shown by letter a is the point at which synchronism is provided. Then, to the point shown by letter f, the carriage 4 continues to travel at the speed synchronized with that of the pipe carrier. During the foregoing operation, the following operation takes place. At the position shown by letter b, clamping of the pipe is effected. Slit formation on the pipe surface by the first blade 11 is made at the point shown by letter c. Pipe cutting is effected by means of the second blade 12 at the position shown by letter d. At the position of letter e, the pipe is unclamped. At the point f, speed of carriage 4 is reduced below the synchronized speed. Then, upon completion of the remaining stroke of the forward travel, the carriage 4 reverses its direction of travel for the return stroke and comes back to the point shown by letter S' at which it stops. At this point, the carriage 4 stands still until the pipe carrier feeds a predetermined length of pipe, and when such length of pipe is measured, carriage 4 repeats the foregoing movement. When the pipe is cut shorter, there will be no stop at the point S', and the operation is repeated continuously.

Using the device of the present invention, it is possible, by the foregoing method, to cut a pipe freely into desired lengths at various speeds.

In the embodiment described above, ball spline shafts 9a and 9b are used. However, shafts with a sliding key may instead be used.

It will be realized from the foregoing description that the present invention provides a solution to the problems found in the conventional pipe shearing devices particularly in the following respects.

With a pair of rotary blades used and operated as described above, a pipe can be cut into desired lengths without any deformation such as a dimple on the end faces thereof. An additional advantage of the invention is that the rotary blades involve no return process so that they should have a much longer life.

Employment of the ball spline shaft mechanism permits smooth movement in shifting of the carriage as well as smooth revolution of the rotary blades with ease.

The drum cam and follower mechanism employed for reciprocal movement of the carriage promises a simple control mechanism for synchronization of the carriage movement speed with the pipe running speed.

Further, the cam with a rail used for the drum cam, and the follower composed of a pair of rollers eliminate chattering at the time of reversal of direction of the carriage and reduce vibration greatly. Moreover, with the drum cam and carriage disposed in parallel and a curtain interposed therebetween, the drum cam side is protected from adverse effects of chipping of the pipe, etc. Thus, the drum cam can be of lighter weight and also reduces the power source requirements as a whole.

Still further, the simplicity of the structure of the chuck mechanism insures exact operation and permits easy and quick replacement and convenient inspection and maintenance.

Additionally, the ball spline shafts are so constructed as to serve as guide shafts of the carriage, and thus the structure of the device is further simplified.

What I claim is:

1. A pipe shearing device, comprising:
   a. a frame;
   b. first and second parallel spline shafts having first and second longitudinal axes respectively rotatably mounted on said frame for rotation about said first and second longitudinal axes;
   c. a carriage longitudinally slidably supported on said first and second spline shafts;
   d. means for feeding a pipe to be cut along a third longitudinal axis parallel said first and second longitudinal axes;
   e. first and second rotary blades mounted to said first and second shafts, respectively, and to said carriage for rotation about said first and second longitudinal axes with said first and second spline shafts and longitudinal movement with said carriage, said first blade being located so as to cut a slit in said pipe when rotated, said second blade being located so as to cut said pipe completely at said slit in one revolution of said second blade;
   f. a drum cam having a cam rail, mounted to said frame for rotation about a fourth longitudinal axis parallel said first and second longitudinal axes;
   g. means, including a pair of follower rollers rotatably mounted to said carriage engaging opposite sides of said cam rail, for reciprocally moving said carriage longitudinally in response to rotation of said drum about said fourth longitudinal axis;
   h. means, including a gear train coupled to said first, second and third shafts, for respectively rotating said first, second and third shafts about said first, second and fourth longitudinal axes, respectively, said first and second shafts rotating in opposite directions such that said first blade first cuts said slit in said pipe and said second pipe then cuts said pipe at said slit; and
   i. a chuck mechanism disposed on said carriage so as to be longitudinally movable therewith, including first and second arms having a clearance formed therein and respective third and fourth blades fixed thereto so as to be closable about and releasable from said pipe, and drive means for closing said first and second arms so that said third and fourth blades grip said pipe when said first and second blades are cutting into said pipe, said first and second blades extending through said clearance during said cutting.

2. A device as in claim 1, wherein said drive means includes a cam surface surrounding, and fixed for rotation with, one of said first and second shafts, a drive shaft, a follower roller rotatably engaging said cam surface, and means, including a roller support rod fixed to said drive shaft, for continuously maintaining said roller in contact with said cam surface, whereby movement of said follower roller along said cam surface by rotation of one of said first and second shafts moves said roller support rod to rotate said drive shaft to close and open said first and second arms to respectively hold and release said pipe.

3. A device as in claim 2, wherein said contact maintaining means includes a spring interposed between said roller support rod and said carriage.

4. A device as in claim 1 or claim 2, further comprising first and second bosses respectively rotatably mounted to said carriage for rotation about said first and second longitudinal axes, respectively enmeshed with said first and second splined shafts for longitudinal sliding movement thereon, said first and second rotary blades being respectively mounted to said first and second bosses for rotation therewith about said first and second longitudinal axes, respectively.

* * * * *